(12) United States Patent
Kuffel et al.

(10) Patent No.: US 11,422,316 B2
(45) Date of Patent: Aug. 23, 2022

(54) OPTICAL COMMUNICATIONS CONNECTORS

(71) Applicant: Panduit Corp., Tinley Park, IL (US)

(72) Inventors: Gregory L. Kuffel, Plainfield, IL (US); Joel D. Kwasny, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/870,119

(22) Filed: May 8, 2020

(65) Prior Publication Data

US 2020/0264387 A1 Aug. 20, 2020

Related U.S. Application Data

(63) Continuation of application No. 15/716,770, filed on Sep. 27, 2017, now abandoned, which is a
(Continued)

(51) Int. Cl.
*G02B 6/38* (2006.01)

(52) U.S. Cl.
CPC ........... *G02B 6/3882* (2013.01); *G02B 6/381* (2013.01); *G02B 6/383* (2013.01); *G02B 6/387* (2013.01);
(Continued)

(58) Field of Classification Search
None
See application file for complete search history.

(56) References Cited

U.S. PATENT DOCUMENTS

| 3,855,700 A | 12/1974 | Caprio et al. |
| 4,496,216 A | 1/1985 | Borsuk |
| (Continued) | | |

FOREIGN PATENT DOCUMENTS

| EP | 0800100 A1 | 10/1997 |
| JP | S61502356 A | 10/1986 |
| (Continued) | | |

OTHER PUBLICATIONS

Telecommunications Industry Association's "Opitcal Fiber Cabling Components Standard," 38 pgs.; Jun. 18, 2008.

*Primary Examiner* — Rhonda S Peace
(74) *Attorney, Agent, or Firm* — Christopher S. Clancy; James H. Williams; Christopher K. Marlow

(57) ABSTRACT

In accordance with the following description, an optical communication connector includes a ferrule having retractable alignment pins that are actuable between an extended position and a retracted position. For example, the connector may include an inner housing assembly having optical fibers and an outer housing positioned over the inner housing assembly. The outer housing is shaped to be removable from the inner housing assembly, which has a movable pin clamp mechanically coupled to alignment pins for aligning the connector with another connector. The pin clamp may be slid from a first position (corresponding to a male gender) to a second position (corresponding to a female gender). Separately or in combination with changing gender, the polarity of a communication connector may be changed due to its inclusion of an asymmetric polarity-changing feature that is actuable by an installer to change a polarity of the communication connector. Such a feature may actuated by being moved from a first position to a second position relative to the communication connector.

5 Claims, 13 Drawing Sheets

Related U.S. Application Data continuation of application No. 15/472,526, filed on Mar. 29, 2017, now Pat. No. 9,798,094, which is a continuation of application No. 15/262,636, filed on Sep. 12, 2016, now Pat. No. 9,638,872, which is a continuation of application No. 14/165,028, filed on Jan. 27, 2014, now Pat. No. 9,442,256, which is a continuation of application No. 12/909,974, filed on Oct. 22, 2010, now Pat. No. 8,636,424.

(52) U.S. Cl.
CPC ......... *G02B 6/3831* (2013.01); *G02B 6/3893* (2013.01); *G02B 6/3898* (2013.01); *G02B 6/3825* (2013.01); *G02B 6/3885* (2013.01)

(56) References Cited

U.S. PATENT DOCUMENTS

| | | |
|---|---|---|
| 4,773,881 A | 9/1988 | Adams, III |
| 5,041,025 A | 8/1991 | Haitmanek |
| 5,265,181 A | 11/1993 | Chang |
| 5,276,752 A | 1/1994 | Gugelmeyer et al. |
| 5,289,554 A | 2/1994 | Cubukciyan et al. |
| 5,315,678 A | 5/1994 | Maekawa et al. |
| 5,521,997 A | 5/1996 | Rovenolt et al. |
| 5,593,323 A | 1/1997 | Dernehl |
| 6,022,149 A | 2/2000 | So et al. |
| 6,149,313 A | 11/2000 | Giebel et al. |
| 6,287,017 B1 | 9/2001 | Katsura et al. |
| 6,340,247 B1 | 1/2002 | Sakurai et al. |
| 6,364,537 B1 | 4/2002 | Maynard |
| 6,474,877 B1 | 11/2002 | Shahid |
| 6,530,696 B1 | 3/2003 | Ueda |
| 7,182,523 B2 | 2/2007 | Abendschein |
| 8,419,291 B2 | 4/2013 | Koreeda |
| 8,876,403 B2 | 11/2014 | Katoh |
| 2005/0117850 A1 | 6/2005 | Mileette |
| 2008/0131055 A1 | 6/2008 | Parkman |
| 2008/0273840 A1 | 11/2008 | Lu |
| 2009/0003772 A1 | 1/2009 | Lu et al. |
| 2010/0158447 A1 | 6/2010 | Nishimura et al. |
| 2010/0220961 A1 | 9/2010 | De Jong et al. |
| 2011/0064361 A1 | 3/2011 | Seng |
| 2011/0229083 A1 | 9/2011 | Dainese et al. |

FOREIGN PATENT DOCUMENTS

| | | |
|---|---|---|
| JP | 04324413 A | 11/1992 |
| JP | H06-043339 | 2/1994 |
| JP | 6102434 A | 4/1994 |
| JP | 07084152 A | 3/1995 |
| JP | 2000338362 A | 12/2000 |
| JP | 2001051161 A | 2/2001 |
| JP | 2001-116955 | 4/2001 |
| JP | 2008-527442 A | 7/2008 |
| WO | 0159493 A2 | 8/2001 |

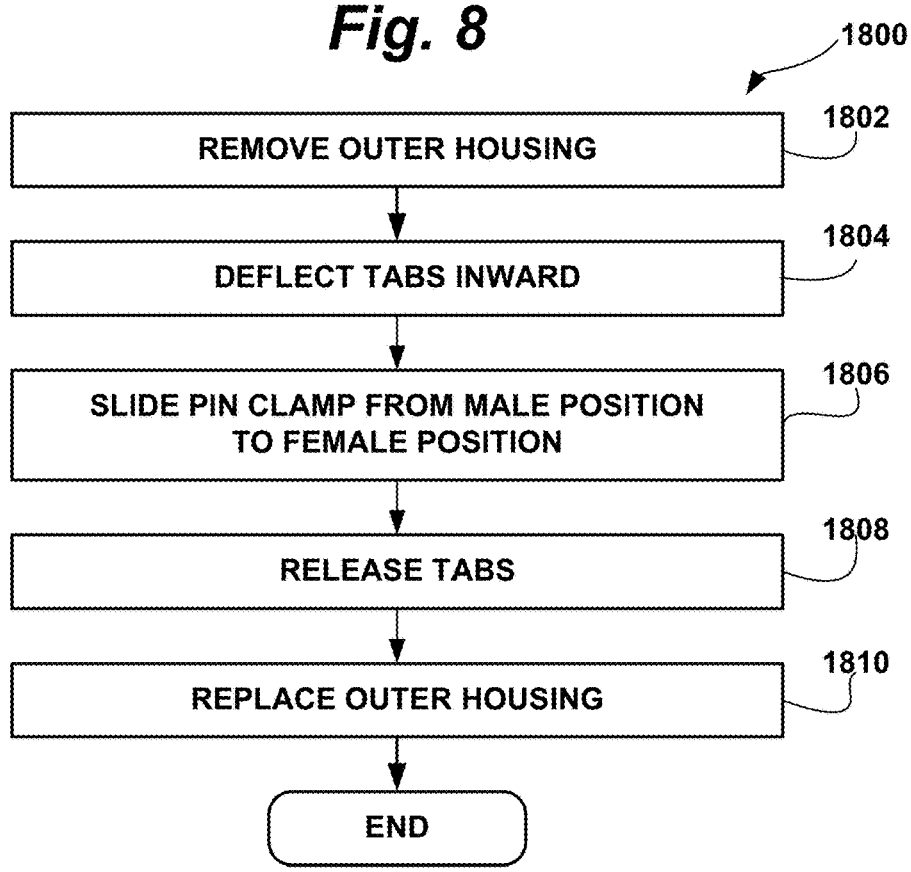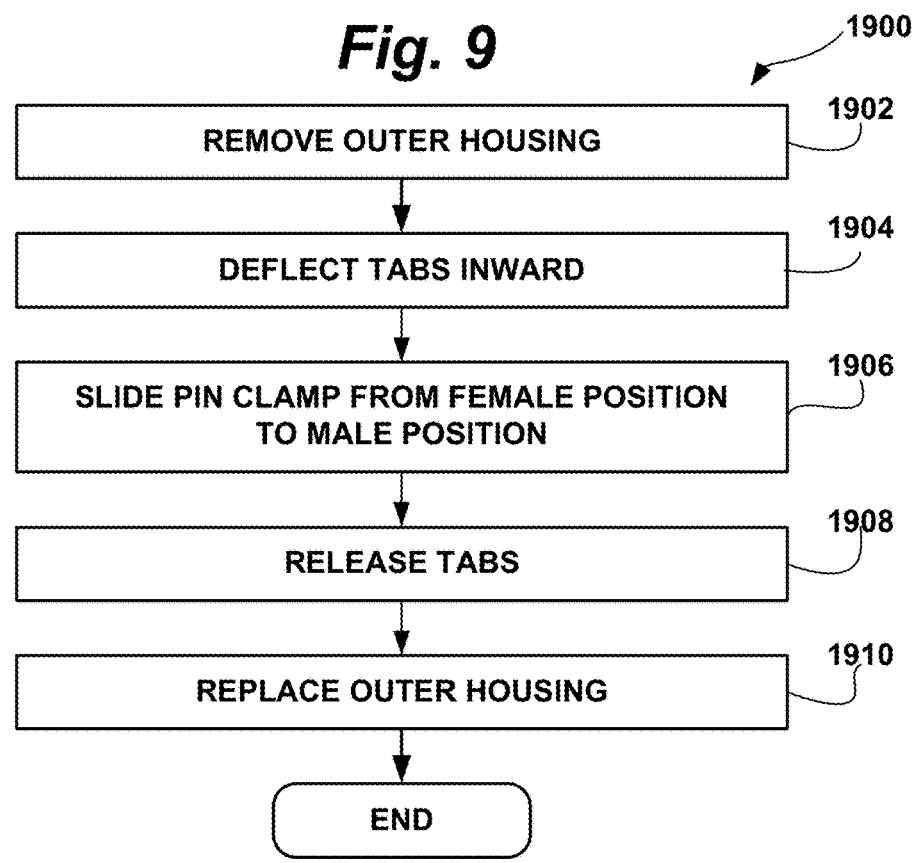

OPTICAL COMMUNICATIONS CONNECTORS

CROSS REFERENCE TO RELATED APPLICATIONS

This application is a continuation of U.S. patent application Ser. No. 15/716,770, filed on Sep. 27, 2017, which is a continuation of U.S. patent application Ser. No. 15/472,526, filed on Mar. 29, 2017, which issued as U.S. Pat. No. 9,798,094 on Oct. 24, 2017, which is a continuation of U.S. patent application Ser. No. 15/262,636, filed on Sep. 12, 2016, which issued as U.S. Pat. No. 9,638,872, on May 2, 2017, which is a continuation of U.S. patent application Ser. No. 14/165,028, filed Jan. 27, 2014, which issued as U.S. Pat. No. 9,442,256 on Sep. 13, 2016, which is a continuation of U.S. patent application Ser. No. 12/909,974, filed Oct. 22, 2010, which issued as U.S. Pat. No. 8,636,424 on Jan. 28, 2014, the entirety of which are hereby incorporated by reference.

FIELD OF INVENTION

The present invention relates generally to communication connectors, and more particularly, to an optical communication connector having a configurable polarity and/or gender.

BACKGROUND

As optical cabling technology continues to improve, bringing higher transmission speeds and better reliability, existing data centers typically must decide whether to upgrade their infrastructures to embrace the newer technology. This involves a cost-benefit analysis to determine whether the benefits to be derived from the upgrade outweigh the costs of the upgrade.

One cost to consider is the extent of the upgrade. An extensive upgrade, such as replacing an entire infrastructure, is likely to be more costly (in equipment costs and installation man-hours) than a less-extensive upgrade, such as swapping out a limited number of components with upgraded components that are able to interface with the existing infrastructure. A data center will typically attempt to reuse existing cabling infrastructure when possible, in order to lessen costs.

Another cost relates to the complexity of each component upgrade. When an upgrade is undertaken, an installer must install the upgraded component so that it interfaces properly with any installed network equipment and intermediate links. This may include matching transmission-speed capabilities, polarity, and/or gender of cables and/or connectors. An increase in the complexity of network equipment, cabling, and connectors may be accompanied by a corresponding increase in the complexity of the installation.

Yet another cost relates to the number of unique parts that must be ordered and installed. This cost is closely related to complexity. An upgrade that requires many unique parts (such as cables and connectors) results in a more complicated Bill of Material (BOM). In turn, an installer must transport and install each of these unique parts. A larger number of unique parts is likely to increase the risk of a part being installed at an incorrect location (e.g. a part installed with a reversed polarity).

Thus, an optical communication connector that assists in reducing the cost of an upgrade and/or that assists in simplifying the upgrade would be desirable.

SUMMARY

In accordance with the following description, an optical communication connector includes a ferrule having retractable alignment pins that are actuable between an extended position and a retracted position. For example, the connector may include an inner housing assembly having optical fibers and an outer housing positioned over the inner housing assembly. The outer housing is shaped to be removable from the inner housing assembly, which has a movable pin clamp mechanically coupled to alignment pins for aligning the connector with another connector. The pin clamp may be slid from a first position (corresponding to a male gender) to a second position (corresponding to a female gender).

The inner housing assembly preferably has a stop surface that defines the first position corresponding to the male gender and the second position corresponding to a female gender. Furthermore, the movable pin clamp preferably has a deflectable tab that may be slid relative to the stop surface from the first position to the second position to change the gender of the connector.

In one embodiment, the outer housing is structured (e.g. with a slot through which the pin clamp can be accessed) so that the pin clamp can be actuated without removing the outer housing.

Another feature described herein relates to changing the polarity of a connector. The outer housing preferably has a polarity key disposed thereon. When the outer housing is rotated 180-degrees along an axis orthogonal to a front face of the connector's ferrule, the polarity key is correspondingly rotated from a first position to a second position, where the first position corresponds to a first polarity and the second position corresponds to a second polarity. The inner housing assembly preferably has at least two recessed features that are each shaped to accept the polarity key when the outer housing is slid over the inner housing assembly.

Generally, the polarity of a communication connector may be changed due to its inclusion of an asymmetric polarity-changing feature that is actuable by an installer to change a polarity of the communication connector. Such a feature may actuated by being moved from a first position to a second position relative to the communication connector.

BRIEF DESCRIPTION OF THE DRAWINGS

The above-mentioned and other features and advantages, and the manner of attaining them, will become more apparent and the technology will be better understood by reference to the following description of one or more embodiments taken in conjunction with the accompanying drawings, wherein:

FIG. 8 is a flow diagram illustrating a method for changing a gender of an optical connector from male to female, according to an embodiment;

FIG. 9 is a flow diagram illustrating a method for changing a gender of an optical connector from female to male, according to an embodiment;

Corresponding reference characters indicate corresponding parts throughout the several views. The exemplification set out herein illustrates one or more preferred embodiments of the invention, and such exemplification is not to be construed as limiting the scope of the invention in any manner.

DETAILED DESCRIPTION OF THE INVENTION

Example Implementation Context

Figure 1:
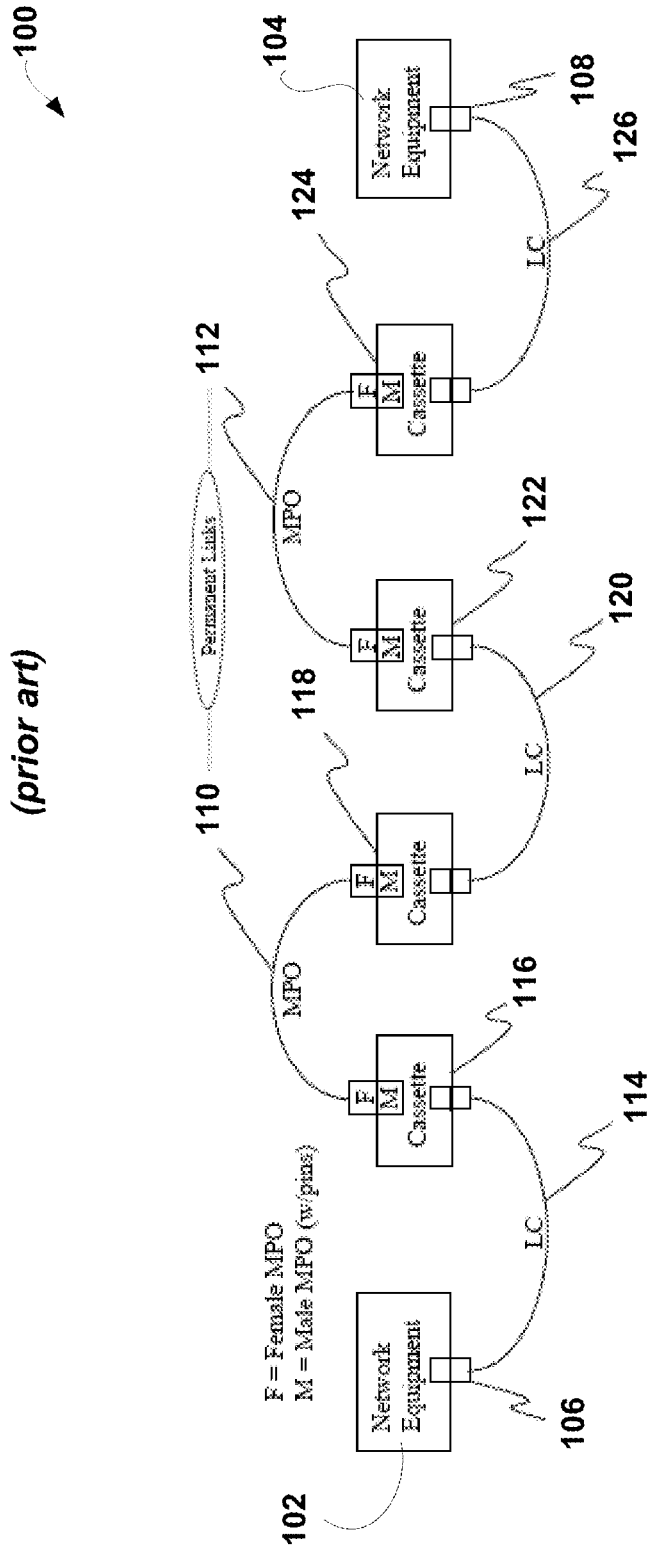
FIG. 1 illustrates a simplified block diagram showing an example of a typical cross connect system.
Figure 2:
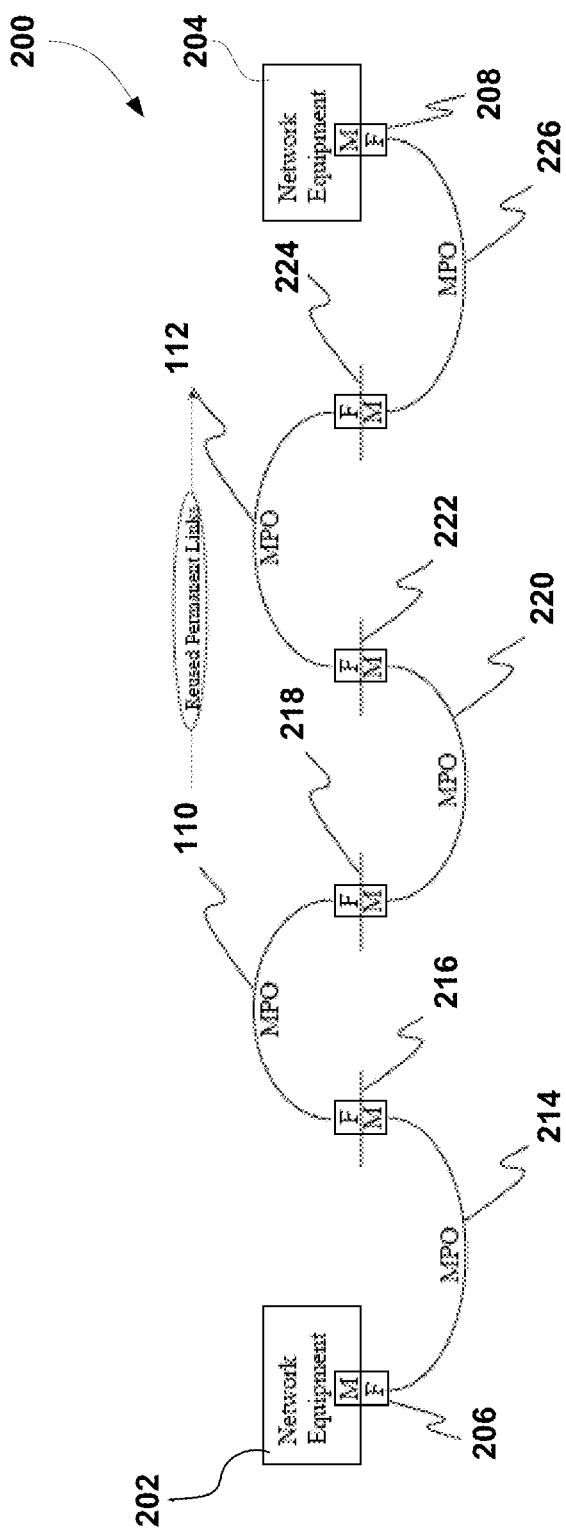
FIG. 2 illustrates a simplified block diagram showing an example of a typical upgraded version of the same cross connect system.

To provide context for much of the discussion herein, FIGS. 1 and 2 set forth an example, based on Method A in the "Optical Fiber Cabling Components Standard," Edition C, Telecommunications Industries Association, Jun. 1, 2008 (TIA-568-C.3), of a typical cross connect system 100 (FIG. 1) and a typical upgraded version of the same cross connect system 200 (FIG. 2).

As can be seen with reference to FIG. 1, first network equipment 102 communicates with second network equipment 104 through an optical communication path comprising a series of ports, cables, and cassettes. Starting from left to right in FIG. 1, the first network equipment 102 has an LC transceiver port 106 that connects through a first LC equipment cord 114 to a first cassette 116. A first MPO (Multi-fiber Push-On) patchcord/trunk cable 110 links the first cassette 116 to a second cassette 118. An LC cross connect cord 120 connects the second cassette 118 to a third cassette 122. A second MPO patchcord/trunk cable 112 links the third cassette 122 to a fourth cassette 124. A second LC equipment cord 126 connects the fourth cassette 124 to the second network equipment 104 through its LC transceiver port 108.

The LC transceiver ports 106 and 108, the LC equipment cords 114 and 126, the LC cross connect cord 120, and cassettes 116, 118, 122, and 124 interface with one another via LC connectors. LC connectors are small form-factor fiber connectors that use a 1.25 mm diameter ceramic ferrule in a standard RJ-45 telephone plug housing (in either a simplex or duplex configuration). In the example shown, the cassettes 116, 118, 122, and 124, which serve as junction points, include LC ports on a front side (for interfacing with the LC equipment cords 114 and 126 and cross connect cord 120) and MPO ports on a rear side (for interfacing with the MPO patchcord/trunk cables 110 and 112). The illustrated patchcord/trunk cables 110 and 112 are Female MPO-Female MPO of Type A, which interface with Male MPO ports on the rear side of the cassettes 116, 118, 122, and 124. In both FIGS. 1 and 2, "F" stands for "Female MPO," while "M" stands for "Male MPO" (with alignment pins).

For purposes of discussion, we will assume that the MPO patchcord/trunk cables 110 and 112 are permanent links to be reused in a proposed upgrade to the example system 100. The LC components are to be upgraded to MPO components, which include/support communications over multiple fibers (e.g. up to 24 strands). Such an upgrade may be to implement 40G data rates, for example. Thus, as shown in FIG. 2, the MPO patchcord/trunk cables 110 and 112 are still present in the upgraded version 200 of the example. The choice of components and reused parts for the example of FIGS. 1 and 2 is completely arbitrary and other configurations and upgrades may utilize the teachings described herein.

As can be seen with reference to FIG. 2, first upgraded network equipment 202 includes a parallel optics transceiver with an MPO port 206 to interface via an MPO patchcord/trunk cable 214 to a first FAP (Fiber Adapter Panel) 216. The first FAP 216 is linked to a second FAP 218 through the first reused MPO patchcord/trunk cable 110 to a second FAP 218. The second FAP 218 is linked through a second MPO patchcord/trunk cable 220 to a third FAP 222. The third FAP 222 is linked to a fourth FAP 224 through the second reused MPO patchcord/trunk cable 112. The fourth FAP 224 is linked through a third MPO patchcord/trunk cable 226 to a parallel optics transceiver with an MPO port 208 on second upgraded network equipment 204.

Comparing FIGS. 1 and 2, as a result of the upgrade from the example 100 to the upgraded version 200, first and second network equipment 102 and 104 has been upgraded to first and second upgraded network equipment 202 and 204 having respective parallel optics MPO transceiver ports. The first LC equipment cord 114 has been upgraded to a Female MPO-Male MPO patchcord/trunk cable-Type A 214. The second LC cross connect cord 120 has been upgraded to a Male MPO-Male MPO patchcord/trunk cable-Type A 220.

The second LC equipment cord 126 has been upgraded to a Female MPO-Male MPO patchcord/trunk cable-Type B 226. The cassettes 116, 118, 122, and 124 have been upgraded to FAPs 216, 218, 222, and 224 with respective MPO adapters. As previously mentioned, the MPO patchcord/trunk cables 110 and 112 are permanent links that were reused in the example upgrade.

Thus, a BOM (Bill of Material) for the above upgrade would list three distinct MPO-MPO cable assemblies (not including the existing, reused cables 110 and 112):

Cable 214: Female MPO-Male MPO patchcord/trunk cable-Type A

Cable 220: Male MPO-Male MPO patchcord/trunk cable-Type A

Cable 226: Female MPO-Male MPO patchcord/trunk cable-Type B.

Overview

In accordance with one or more embodiments described herein, an installer can change a gender of an optical communication connector, such as an MPO patchcord/trunk cable connector, from male to female (or visa versa) by removing an outer housing and retracting (or extending) alignment pins corresponding to the gender of the cable. As a result, few unique component types are required. This will simplify the BOM, since there are fewer part number variations, due to the same cables (possibly with different length) being used. In addition, installation is made easier, since parts are more generic and can be adapted as needed for particular parts of the installation. The installer can conveniently change the gender of the connector in the field.

In accordance with one or more embodiments described herein, an installer can change a polarity of an optical communication connector, such as an MPO patchcord/trunk cable connector, from a first polarity to a second polarity by reversing a configuration of a polarity key. Thus, a single component can be used for either polarity, which reduces the number of unique component types required for a typical installation, simplifies the BOM, and makes installation easier.

The above-summarized retractable alignment pins and reversible polarity key may be implemented separately or in combination.

Retractable Alignment Pins

Figure 3:
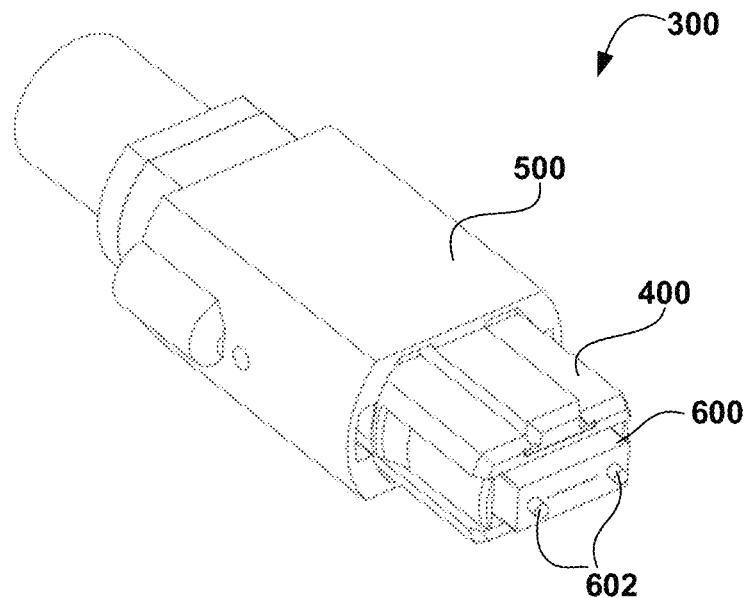
FIG. 3 is an upper left perspective view of an MPO connector (an example of an optical connector) in the Male orientation.
Figure 4:
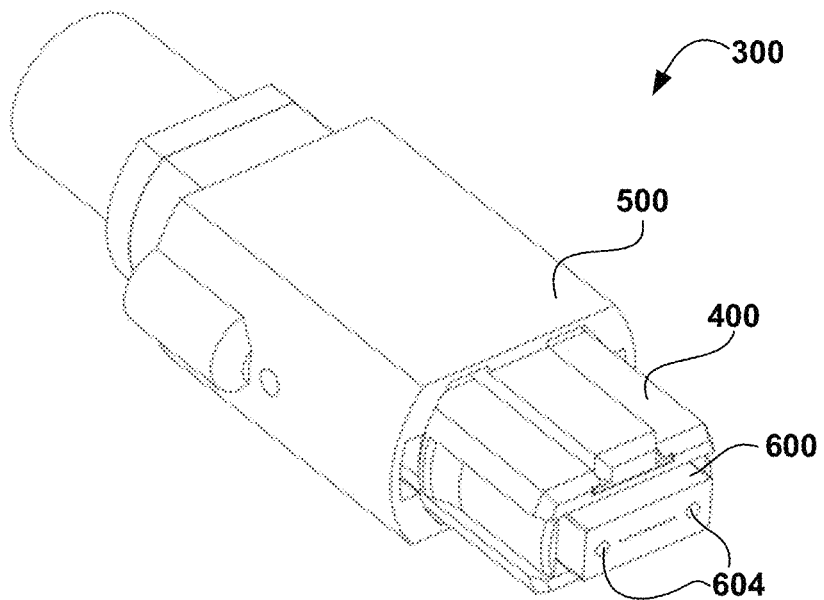
FIG. 4 is an upper left perspective view of an MPO connector (an example of an optical connector) in the Female orientation.

As can be seen with reference to FIG. 3, an MPO connector 300 (an example of an optical connector) in the male orientation includes an inner housing assembly 400, an outer housing 500, a ferrule 600, and alignment pins 602 extending outward from the ferrule 600, which contains optical fibers for communication. Similarly, FIG. 4 shows the MPO connector 300 in the female orientation, with the alignment pins 602 retracted into alignment pin cavities 604. The same MPO connector 300 can thus be used in both the male and female orientation by respectively extending or retracting the alignment pins 602.

Figure 5:
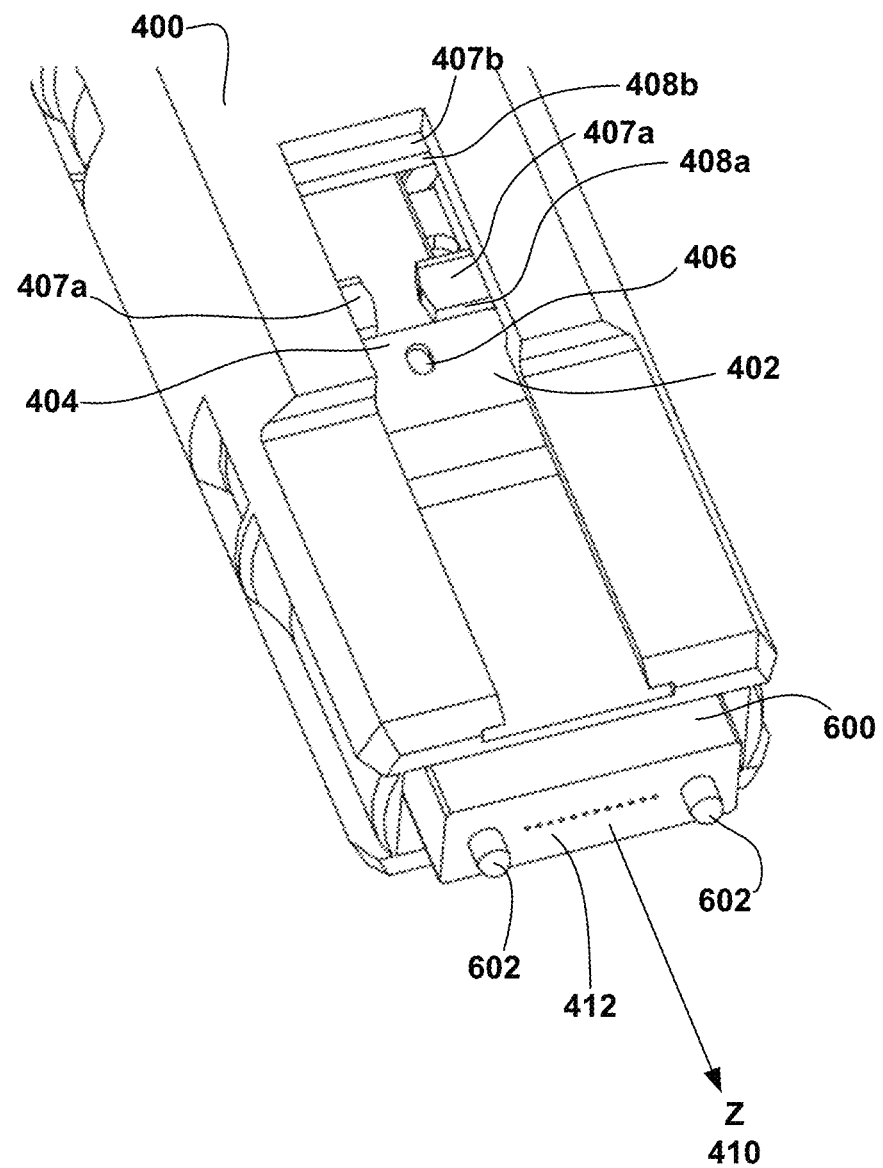
FIG. 5 is an upper left perspective view of a portion of a Male-oriented MPO connector with the outer housing removed.
Figure 6:
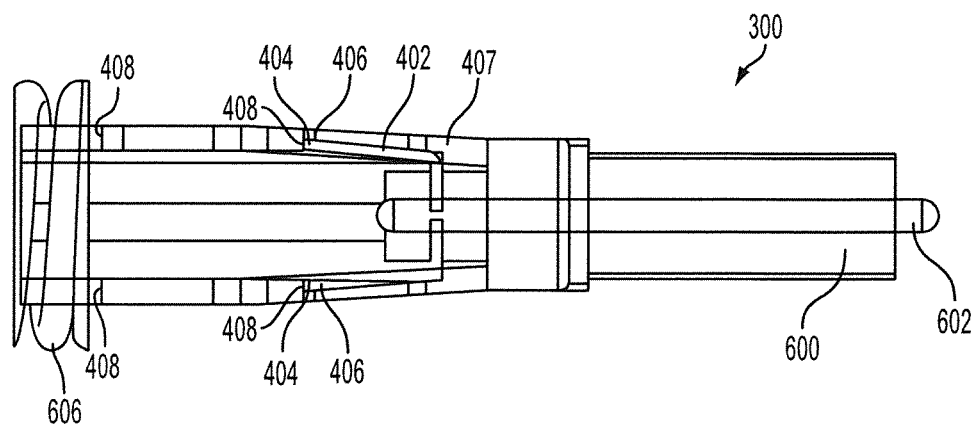
FIG. 6 is a cross-sectional side view of the portion of the MPO connector shown in FIG. 5, showing the retractable pin clamp in the first (Male) position.
Figure 7:
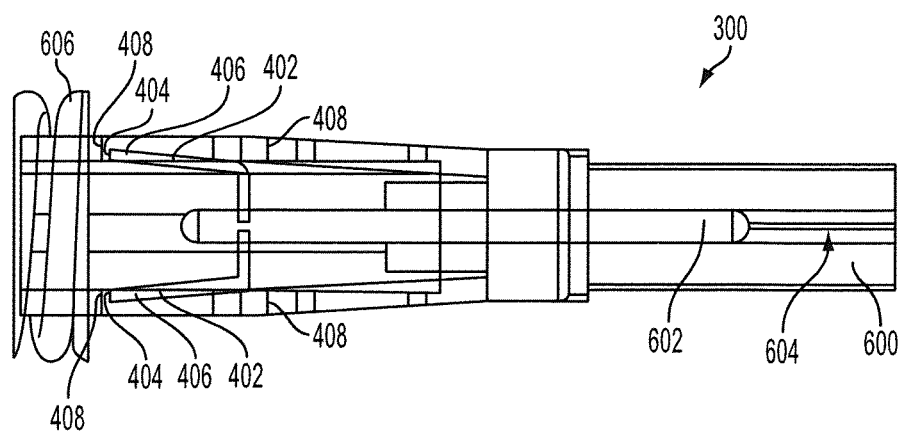
FIG. 7 is a cross-sectional side view of the portion of the MPO connector shown in FIG. 5, showing the retractable pin clamp in the second (Female) position.

FIG. 5 shows a portion of the MPO connector 300 with the outer housing 500 removed to expose a retractable pin clamp 402. The retractable pin clamp 402 is mechanically coupled (preferably fixed) to the alignment pins 602 through the ferrule 600. The retractable pin clamp 402 preferably includes one or more tabs 404, each with a hole 406 for engagement by a tool. One or more spacers 407 situated in the inner housing assembly 400 includes one or more corresponding stop surfaces 408, adjacent to the one or more tabs 404, to define a first position (a male position) and a second position (female position) for the retractable pin clamp 402. FIGS. 6 and 7 are cross-sectional side views of the portion of the MPO connector 500 shown in FIG. 5, showing the retractable pin clamp 402 in the first and second positions, respectively, according to a preferred embodiment.

The process for changing the gender of the connector will now be described with reference to FIGS. 5-7, which show a preferred embodiment in which the retractable pin clamp 402 has two tabs 404, each having a hole 406 and the spacer 407 has two stop surfaces 408. After removing the outer housing 500 from the MPO connector 300, an installer may slide the retractable pin clamp 402 along a z-axis 410 that is orthogonal to a front face 412 of the ferrule 600 to cause the alignment pins 602 to move between the male configuration and the female configuration. To do so, the installer deflects the tabs 404 inward (toward each other) by engaging the two holes 406 with a tool (such as a pliers-like tool having two pegs that mate with the two holes 406) and sliding the retractable pin clamp 402 (and coupled alignment pins 602) along the z-axis 410 between the first position (male position) and the second position (female position). The installer releases the tool to lock the retractable pin clamp 402 into position along the z-axis 410 on the other side of the stop surfaces 408. The installer may then reinstall the outer housing 500, so that the connector is ready for mating to an opposite gender connector.

In other embodiments of the invention, tools are not necessary to affect the gender change. For example, referring to FIG. 5, the hole 406 can be replaced with a post for fingertip actuation.

The first position (male position) and second position (female position) are defined by the dimensions of the stop surfaces 408, and in particular, by the z-axis length between the stop surfaces 408. Preferably, this length should be greater than approximately twice the extended length of one of the alignment pins 602 relative to the front face 412 of the ferrule 600. This ensures that two oppositely-gendered connectors 300 will be able to interface completely, so that the extended alignment pins 602 of the male connector 300 are fully engaged within the corresponding cavities 604 housing the retracted alignment pins 602 of the female connector 300. In addition to setting the distance through which the alignment pins 602 are extended and retracted with the stop surfaces 408, the spacer 407 also helps transfer a load from a spring 606 to the ferrule 600 to isolate the retractable pin clamp 402.

While the above description pertains to a preferred implementation of a connector having a changeable gender, other implementations are also possible. For example, one example implementation utilizes only a single tab 404 that is deflected to move below a single stop surface 408. Another example implementation utilizes more than two tabs 404 and/or more than two stop surfaces 408. In yet another example implementation, rather than being fixed to the alignment pins 602, the retractable pin clamp 402 is coupled to the alignment pins 602 by some other type of mechanical linkage that causes the alignment pins 602 to extend or retract by a larger displacement than the displacement of the actuated retractable pin clamp 402. In yet another alternative implementation, the stop surfaces 408 are not part of the inner housing assembly 400. Many other alternatives are possible for implementing the connector as claimed herein.

FIGS. 8 and 9 are flow diagrams illustrating methods 1800 and 1900 for changing a gender of an optical connector, such as the connector 300 described above, from male to female and from female to male, respectively.

In the method 1800, an installer removes the outer housing 500 from the connector 300, as shown in block 1802.

The installer deflects inward one or more tabs 404 on the retractable pin clamp 402, as shown in block 1804, and slides the retractable pin clamp 402 from a male position to a female position, causing the alignment pins 602 to retract into the ferrule 600, as shown in block 1806. The installer releases the tabs, as shown in block 1808, and replaces the outer housing 500, as shown in block 1810. The method 1900 differs from the method 1800 only in block 1906, in which the installer slides the retractable pin clamp 402 from a female position to a male position, causing the alignment pins 602 to extend out of the ferrule 600. Blocks 1902, 1904, 1908, and 1910 in the method 1900 correspond respectively to blocks 1802, 1804, 1808, and 1810 in the method 1800. In methods according to embodiments of the present invention, the connector assembly remains intact, and the fibers within the connector are not exposed to damage or handling during reconfiguration.

Reversible Polarity Key

In addition to gender, another parameter to be considered by an installer during an upgrade is the polarity of a connector. The polarity may be considered separately or in combination with the gender, depending on the specific type (e.g. mechanical configuration) of optical connector.

Figure 10:
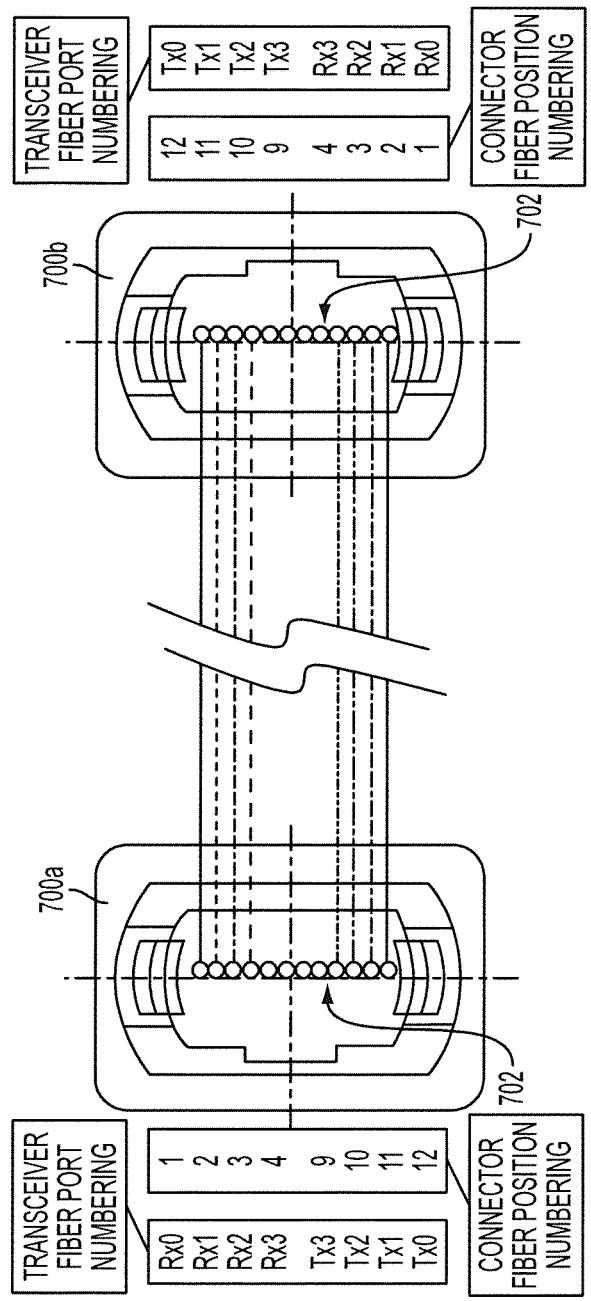
FIG. 10 is a simplified schematic diagram illustrating a transceiver mapping of two connectors communicating over eight of twelve provided fiber channels.
Figure 11:
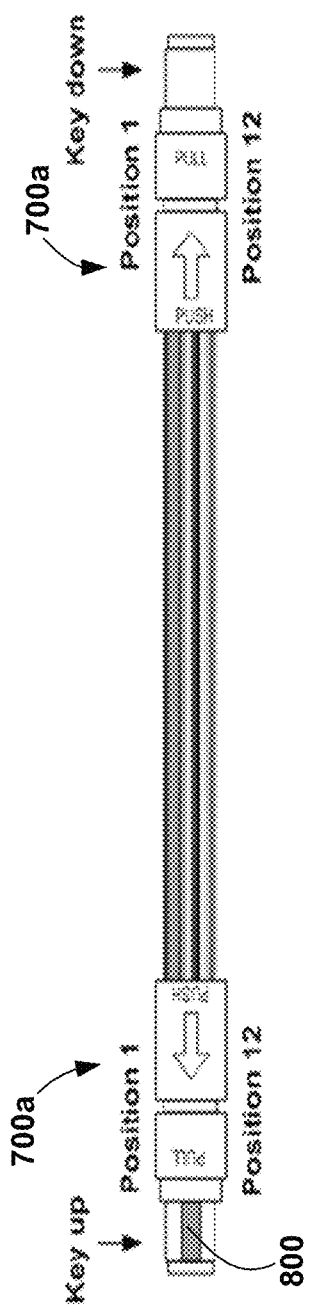
FIG. 11 is a simplified plan view of a Type-A patch cord/connector cable.
Figure 12:
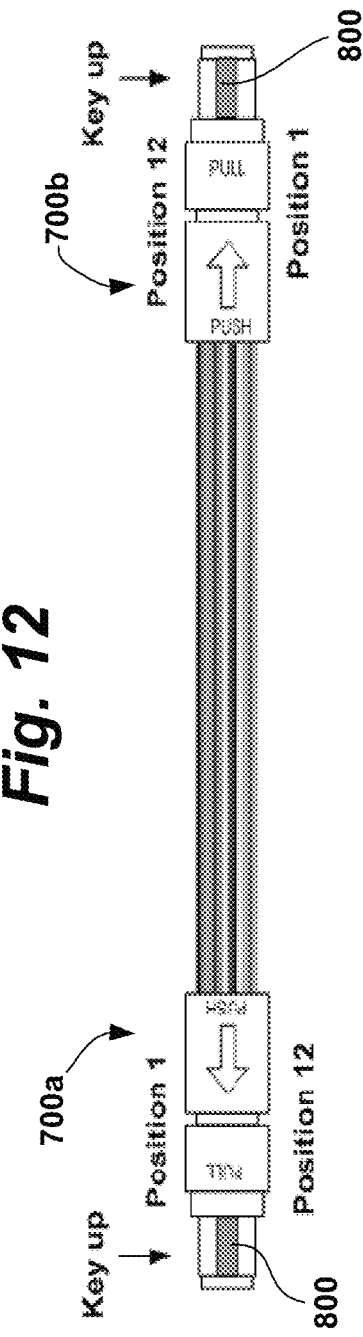
FIG. 12 is a simplified plan view of a Type-B patch cord/connector cable.
Figure 13:
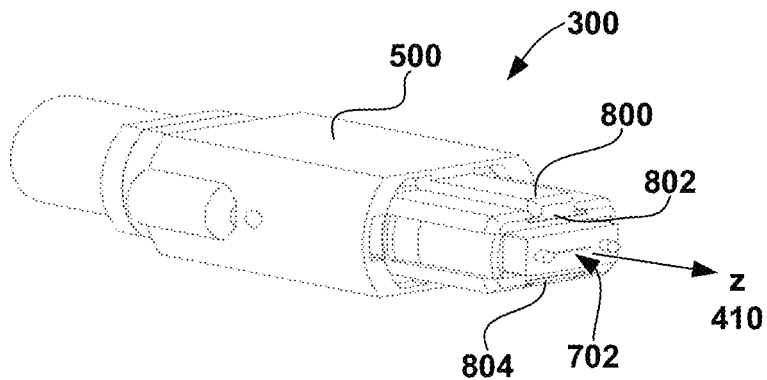
FIG. 13 is an upper left perspective view of a connector in accordance with a preferred embodiment.
Figure 14:
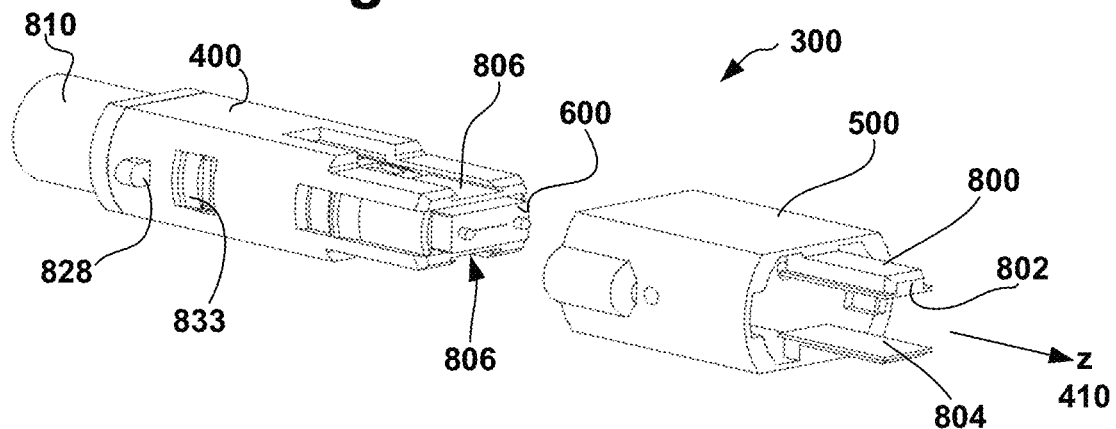
FIG. 14 is an upper left perspective view of a partially disassembled connector in accordance with a preferred embodiment.
Figure 15:
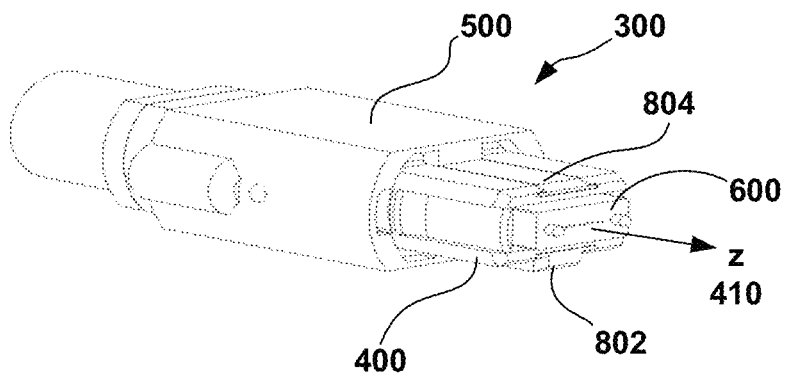
FIG. 15 is an upper left perspective view of a connector in accordance with a preferred embodiment.

In order to utilize a parallel optics transceiver with an MPO port, there must be at least one Type-B MPO-MPO patchcord in the link, assuming connectivity Method A is utilized per the "Optical Fiber Cabling Components Standard," Edition C, Telecommunications Industries Association, Jun. 1, 2008 (TIA-568-C.3), which is incorporated by reference herein in its entirety. FIGS. 10-12 are provided for clarification. FIG. 10 is a simplified schematic diagram illustrating a transceiver mapping of two connectors communicating over eight of twelve provided fiber channels. FIGS. 11 and 12 are simplified plan views of respective Type-A and Type-B patch cords/connector cables. As can be seen with reference to FIGS. 10-12, including at least one Type-B MPO-MPO patchcord in the link effectively routes channel 1 to channel 12, channel 2 to channel 11, channel 3 to channel 10, and channel 4 to channel 9, which effectively routes transmit (Tx) to receive (Rx). Fiber numbers 9 through 12 of transceiver 700 *a* transmit (Tx) one or more communication signals to fiber numbers 1 through 4 of transceiver 700 *b*, which receive (Rx) the corresponding signal(s) across these four fibers. Fiber numbers 1 through 4 of transceiver 700 *a* receive (Rx) signal(s) from fiber numbers 9 through 12 of transceiver 700 *b*, which transmit (Tx) the corresponding signal(s) across these four fibers. The fiber scheme shown and described with reference to FIGS. 10-12 is compatible with the "Transceiver MPO Connector" transmit/receive configuration established by the POP4 MSA "Four Channel Pluggable Optical Transceiver Multi-Source Agreement" industry technical specification, which is incorporated by reference herein in its entirety.

The polarity keys 800 shown in FIGS. 11 and 12 will be discussed below, in conjunction with FIGS. 13-17. In essence, the polarity keys 800 provide a mechanical means for identifying the polarity and for ensuring proper interfacing between adjoining connectors.

Changing the polarity of one connector in a patchcord effectively changes it from Type-A to Type-B, or vice versa. As will be described in detail below, an installer can change the polarity of an optical communication connector, such as an MPO patchcord/trunk cable connector, from a first polarity to a second polarity by reversing a configuration of a polarity key. Thus, a single component can be used for either polarity, which reduces the number of unique component types required for a typical installation, simplifies the BOM, and makes installation easier. For an installation involving a plurality of patchcords, only one type of patchcord needs to be ordered, and during installation, it does not matter where each cable end is located, since the polarity can be changed as needed. Further, the connector interior (including the fiber and ferrule), is not exposed to damage during the polarity changing operation.

FIGS. 13-17 are perspective views illustrating a connector 300 and associated components, in both assembled and partially disassembled configurations. In these figures, like reference numerals refer to like components.

A polarity key 800 is integrated into the outer housing 500. For example, the outer housing 500 may have the polarity key 800 integrally formed therein. Alternatively, the polarity key 800 may be a separate piece that is attached to the outer housing 500 by an appropriate fastener or adhesive.

The polarity key 800 includes, at its base, a polarity key tab 802. Formed opposite the polarity key tab 802 and integrated into (integrally formed in or separately fastened to) the outer housing 500 is a blank tab 804. The polarity key tab 802 and the blank tab 804 extend outward, along the z-axis 410. Unlike the polarity key tab 802, the blank tab 804 does not include a polarity key, and instead serves as a filler, thus, effectively being an absence of the polarity key 802, as will be described below.

The inner housing assembly 400 includes two symmetric recessed features 806, one on either side of where the ferrule 600 is located in the inner housing assembly 400. The recessed features 806 are shaped and configured to accept the polarity key tab 802 (and associated polarity key 800) and the blank tab 804. According to a preferred embodiment, the polarity of the connector 300 is reversed by removing and rotating the outer housing 500 180-degrees around the z-axis 410 of the ferrule 600 and reinstalling the outer housing 500 into the assembly 400. The polarity key tab 802 and blank tab 804 fit into the recessed features 806 opposite of where they were before the 180-degree rotation. As a result, only the outer housing 500 is removed. The inner housing assembly 400 is not removed, which prevents disturbing the sensitive spring 606, ferrule 600, optical fiber, and spring push assembly 810. Removing the inner housing assembly 400 would also expose the optical fibers, which is undesirable.

Figure 16:
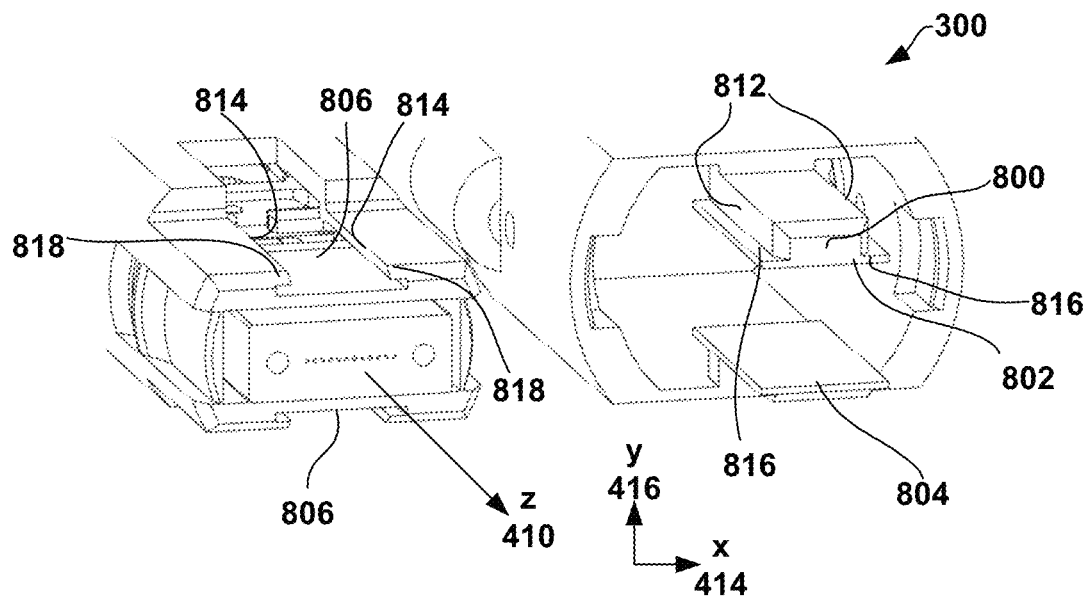
FIG. 16 is an upper left perspective front view of an inner housing assembly and an outer housing of a partially disassembled connector in accordance with a preferred embodiment.

The preferably symmetric design of the inner housing assembly 400 allows the outer housing 500 to be flipped and reinstalled for polarity-changing. As illustrated in FIG. 16, the recessed features 806 on the inner housing assembly 400 help the installer to locate and secure the geometries of the polarity key tab 802 and the blank tab 804 on the outer housing 500. Sidewalls 812 on the polarity key 800 and/or polarity key tab 802 interface with corresponding polarity key sidewall retainers 814 to control movement of the polarity key tab 802 and blank key tab 804 in the x-axis direction 414. Similar sidewalls are placed on the blank tab 804. To control movement of the polarity key tab 802 in the y-axis direction 416, the polarity key tab 802 and blank key tab preferably both include planar protrusions 816 that are overlapped by protrusion retainers 818 located on the inner housing assembly 400 as part of the recessed features 806. The protrusion retainers 818 thus serve as guides along which the outer housing 500 may slide via its polarity key tab 802 and blank tab 804, as illustrated in FIGS. 13-16.

Figure 17:
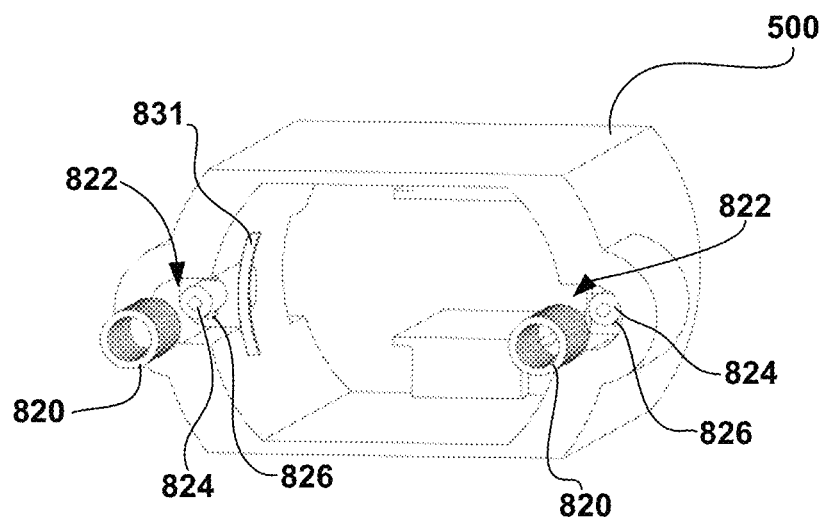
FIG. 17 is a rear perspective view illustrating a back side of the outer housing (i.e. opposite the polarity key) according to a preferred embodiment.

FIG. 17 is a rear perspective view illustrating a back side of the outer housing 500 (i.e. opposite the polarity key 800) according to a preferred embodiment. The outer housing 500 includes two compression springs 820 located on compression spring alignment posts 824 in respective compression spring wells 822. Small crush ribs 826 are located on the alignment posts 824. During assembly, the compression springs 820 are pressed over the crush ribs 826 around the alignment posts 824 and are thus held in place by interference with the crush ribs 826. Stop posts 828 on the exterior of the inner housing assembly 400 interface with the compression spring wells 822 when the outer housing 500 is assembled onto the inner housing assembly 400. The stop posts 828 provide a surface for the compression springs 820 to act (compress) against, to force the outer housing forward (toward the ferrule endpiece). Ribs 831 of the outer housing engage with detents 833 of the inner housing assembly 400 to prevent the compression spring from separating the outer housing 500 from the inner housing assembly 400.

Figure 18:
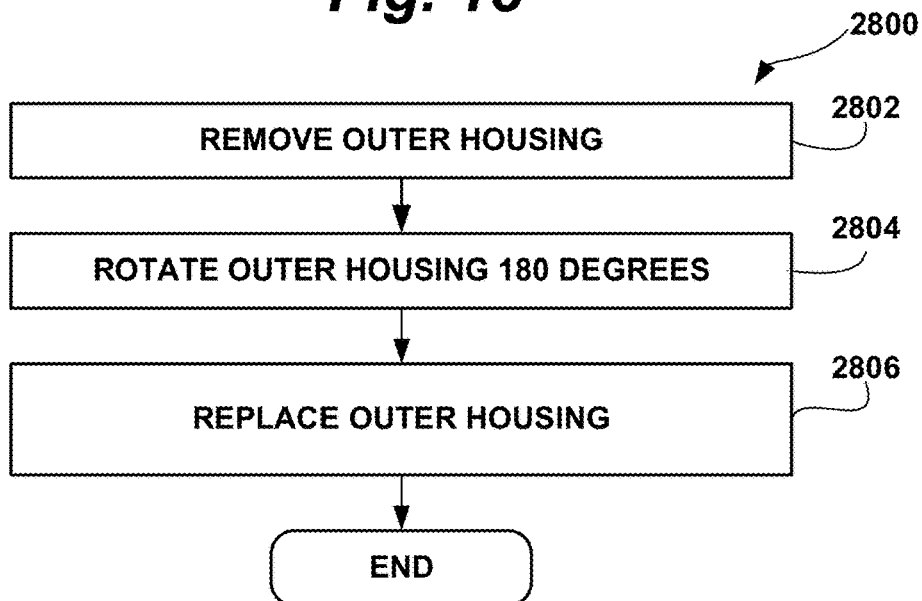
FIG. 18 is a flow diagram illustrating a method for changing a polarity of an optical connector, according to an embodiment.

FIG. 18 is a flow diagram illustrating a method 2800 for changing a polarity of an optical connector, such as the connector 300 described above. In the method 2800, an installer removes the outer housing 500 from the connector 300, as shown in block 2802. The installer rotates the outer housing 180-degrees around the z-axis (orthogonal to the front face of the ferrule 600), as shown in block 2804, and replaces the outer housing 500, as shown in block 2806.

Figure 19:
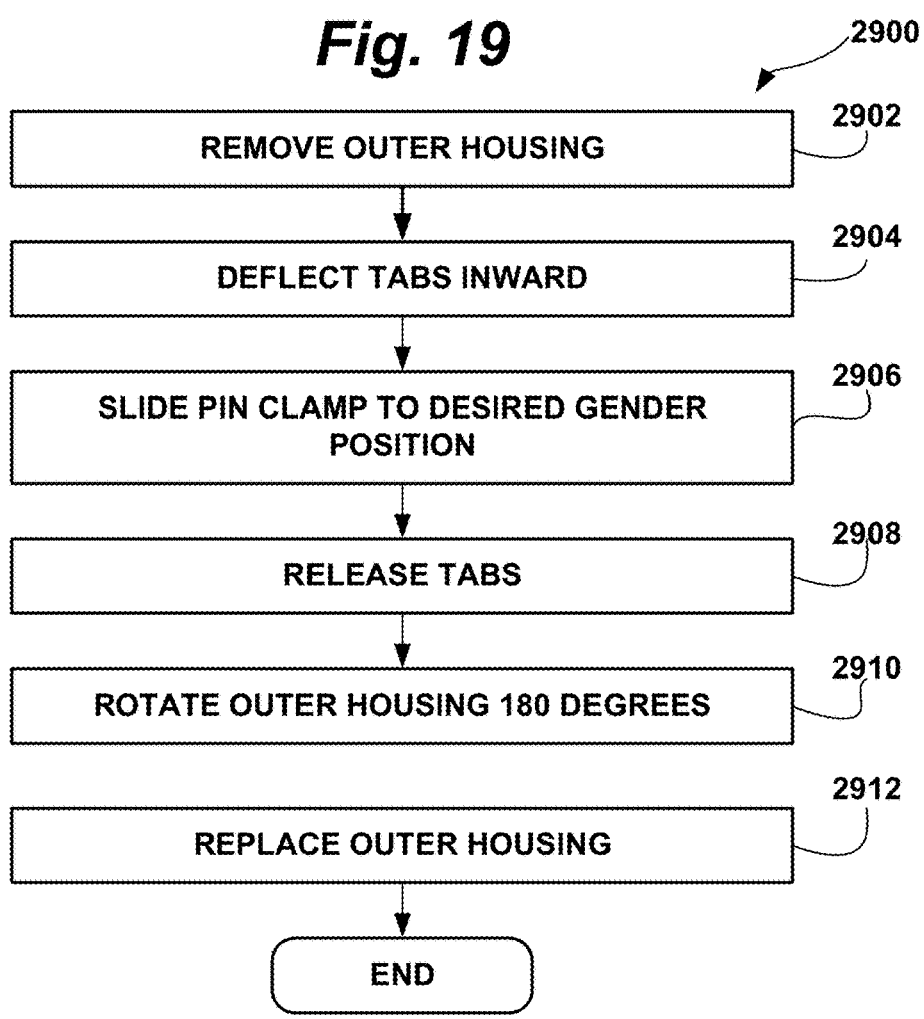
FIG. 19 is a flow diagram illustrating a method for changing a gender and a polarity of an optical connector, according to an embodiment.

FIG. 19 is a flow diagram illustrating a method 2900 for changing a gender and a polarity of an optical connector, such as the connector 300 described above. In the method 2900, an installer removes the outer housing 500 from the connector 300, as shown in block 2902. The installer deflects inward one or more tabs 404 on the retractable pin clamp 402, as shown in block 2904, and slides the retractable pin clamp 402 to appropriate gender position (male or female, as defined by location relative to the stop surface(s) 408), causing the alignment pins 602 to retract into or extend out of the ferrule 600, as appropriate, as shown in block 2906. The installer releases the tabs 404, as shown in block 2908. The installer then rotates the outer housing 500 180-degrees around the z-axis (orthogonal to the front face of the ferrule 600), as shown in block 2910, and replaces the outer housing 500, as shown in block 2912.

Figure 20:
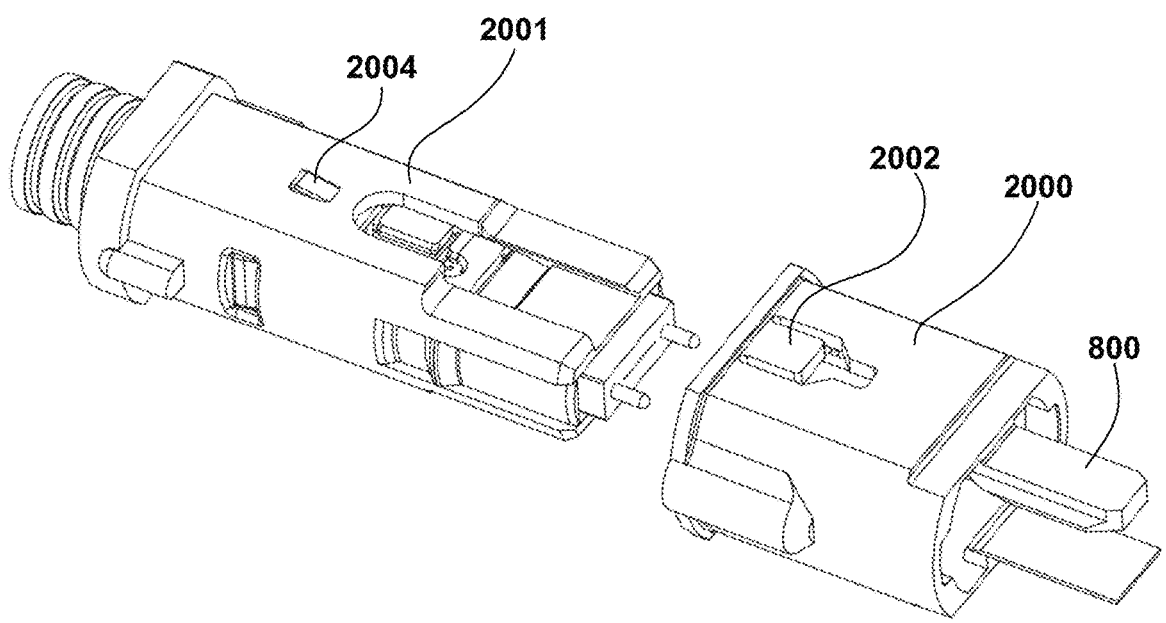
FIG. 20 is a perspective view of an alternative embodiment of a connector according to the present invention, showing an outer housing separated from an inner housing assembly.
Figure 21:
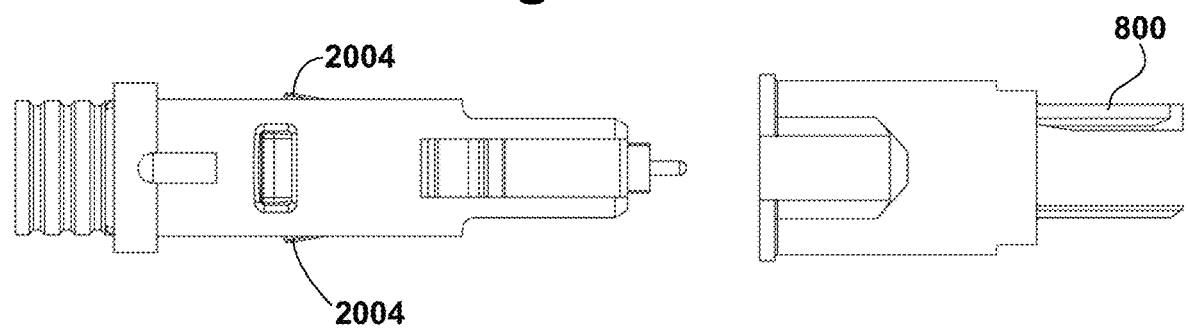
FIG. 21 is a side view of the embodiment of FIG. 20, showing an outer housing separated from an inner housing assembly.
Figure 22:
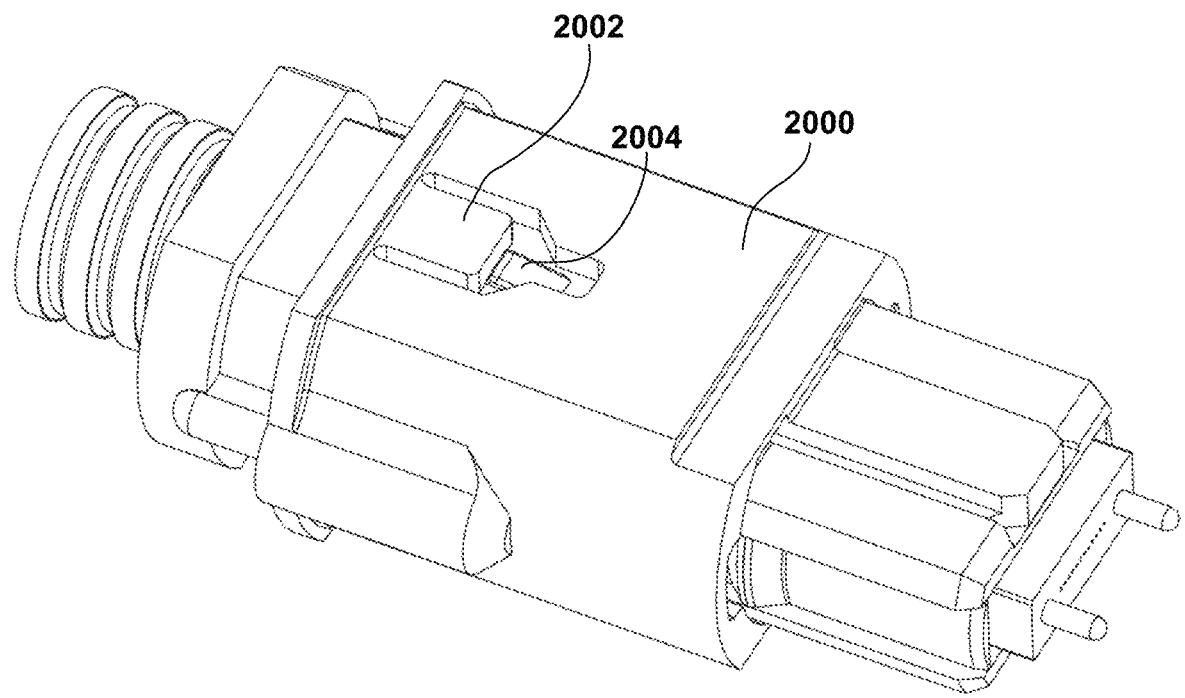
FIG. 22 is a perspective view of the embodiment of FIG. 20, with the outer housing latched to the inner housing assembly.

FIG. 20 is a perspective diagram of another embodiment of the present invention, in which the outer housing 2000 latches to an inner housing assembly 2001 using deflecting latch flaps 2002 provided on the outer housing 2000 and latch ramps 2004 provided on the inner housing assembly 2001. FIG. 21 is a side view of this embodiment. The location of the polarity key 800 can be swapped between the top and bottom of the connector by flipping the outer housing before attaching the outer housing 2000 to the inner housing assembly 2001. FIG. 22 is a perspective view of an assembled connector of this embodiment. In this embodiment, the outer housing 2000 can be unlatched by squeezing the outer housing from the sides. Clearance along the sides of the outer housing 2000 then allows the top and bottom portions of the outer housing to bow outwardly, allowing unlatching.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. An optical communications connector, comprising:
an outer housing surrounding a multi-fiber ferrule; and
a polarity key integrated into the outer housing of the connector, the polarity key having a configuration that can be altered to change a polarity of the connector by rotating the polarity key in relation to the connector,
wherein the outer housing is rotatable around an axial length of the connector to effect the change in polarity.

2. The optical communications connector of claim 1, comprising:
a ferrule having retractable alignment pins that are actuable between an extended position and a retracted position.

3. The optical communications connector of claim 1, wherein the polarity key is integrated into the outer housing.

4. The optical communications connector of claim 1, wherein the polarity key is formed separately from the outer housing and attached to the outer housing.

5. The optical communications connector of claim 1, comprising:
an inner housing, the inner housing comprising recessed features that are shaped to accept the polarity key when the outer housing is installed over the inner housing.

* * * * *